United States Patent
Ye et al.

(10) Patent No.: US 9,756,353 B2
(45) Date of Patent: Sep. 5, 2017

(54) HYBRID REFERENCE PICTURE RECONSTRUCTION METHOD FOR SINGLE AND MULTIPLE LAYERED VIDEO CODING SYSTEMS

(71) Applicant: DOLBY LABORATORIES LICENSING CORPORATION, San Francisco, CA (US)

(72) Inventors: Yan Ye, San Diego, CA (US); Peng Yin, Ithaca, NY (US); Yuwen He, San Diego, CA (US); Walter C. Gish, Oak Park, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 564 days.

(21) Appl. No.: 14/370,400

(22) PCT Filed: Dec. 20, 2012

(86) PCT No.: PCT/US2012/071086
§ 371 (c)(1),
(2) Date: Jul. 2, 2014

(87) PCT Pub. No.: WO2013/106190
PCT Pub. Date: Jul. 18, 2013

(65) Prior Publication Data
US 2014/0341273 A1    Nov. 20, 2014

Related U.S. Application Data

(60) Provisional application No. 61/584,806, filed on Jan. 9, 2012, provisional application No. 61/584,805, filed on Jan. 9, 2012.

(51) Int. Cl.
H04N 7/12      (2006.01)
H04N 19/44    (2014.01)
(Continued)

(52) U.S. Cl.
CPC ............. *H04N 19/44* (2014.11); *H04N 19/10* (2014.11); *H04N 19/103* (2014.11);
(Continued)

(58) Field of Classification Search
CPC ...... H04N 19/44; H04N 19/10; H04N 19/103; H04N 19/172; H04N 19/182;
(Continued)

(56) References Cited

U.S. PATENT DOCUMENTS 7,840,078 B2   11/2010  Segall
7,983,496 B2    7/2011  Liu
(Continued)

FOREIGN PATENT DOCUMENTS

WO   2008/049445   5/2008

OTHER PUBLICATIONS

ITU-T Recommendatiion H.264 "Advanced Video Coding for Generic Audiovisual Services", Mar. 2010.
(Continued)

*Primary Examiner* — Gims Philippe
(74) *Attorney, Agent, or Firm* — Alessandro Steinfl; Steinfl & Bruno LLP

(57) ABSTRACT

An inter-layer reference picture is generated either by considering an inverse mapped signal from a base layer, a temporal signal from an enhancement layer, or a combination of both.

25 Claims, 7 Drawing Sheets

(51) Int. Cl.

| | | |
|---|---|---|
| *H04N 19/36* | (2014.01) | |
| *H04N 19/10* | (2014.01) | |
| *H04N 19/172* | (2014.01) | |
| *H04N 19/103* | (2014.01) | |
| *H04N 19/182* | (2014.01) | |
| *H04N 19/187* | (2014.01) | |
| *H04N 19/33* | (2014.01) | |
| *H04N 19/537* | (2014.01) | |
| *H04N 19/55* | (2014.01) | |
| *H04N 19/59* | (2014.01) | |

(52) U.S. Cl.
CPC ......... *H04N 19/172* (2014.11); *H04N 19/182* (2014.11); *H04N 19/187* (2014.11); *H04N 19/33* (2014.11); *H04N 19/36* (2014.11); *H04N 19/537* (2014.11); *H04N 19/55* (2014.11); *H04N 19/59* (2014.11)

(58) Field of Classification Search
CPC ...... H04N 19/187; H04N 19/33; H04N 19/36; H04N 19/537; H04N 19/55; H04N 19/59
USPC .................................................... 375/240.02
See application file for complete search history.

(56) References Cited

U.S. PATENT DOCUMENTS

| | | | |
|---|---|---|---|
| 8,085,852 B2 | 12/2011 | Liu | |
| 8,130,828 B2 | 3/2012 | Hsu | |
| 8,477,853 B2 | 7/2013 | Wu | |
| 8,532,176 B2 | 9/2013 | Segall | |
| 8,576,907 B2* | 11/2013 | Demos | H04N 19/0009 |
| | | | 375/240.03 |
| 8,718,132 B2 | 5/2014 | Cho | |
| 8,743,969 B2 | 6/2014 | Sasai | |
| 8,774,269 B2 | 7/2014 | Marpe | |
| 8,907,823 B2 | 12/2014 | Marpe | |
| 8,934,542 B2 | 1/2015 | Wiegand | |
| 8,995,525 B2 | 3/2015 | Wiegand | |
| 9,030,579 B2 | 5/2015 | Yasuda | |
| 2006/0083308 A1 | 4/2006 | Schwarz | |
| 2006/0104354 A1 | 5/2006 | Han | |
| 2006/0233254 A1 | 10/2006 | Lee | |
| 2007/0211798 A1 | 9/2007 | Boyce | |
| 2007/0230564 A1 | 10/2007 | Chen | |
| 2008/0008394 A1 | 1/2008 | Segall | |
| 2008/0089417 A1 | 4/2008 | Bao | |
| 2008/0193032 A1 | 8/2008 | Segall | |
| 2009/0086816 A1 | 4/2009 | Leontaris | |
| 2009/0097558 A1 | 4/2009 | Ye | |
| 2009/0110073 A1 | 4/2009 | Wu | |
| 2009/0135915 A1 | 5/2009 | Marpe | |
| 2009/0225869 A1 | 9/2009 | Cho | |
| 2010/0020866 A1 | 1/2010 | Marpe | |
| 2010/0135393 A1 | 6/2010 | Ying Gao | |
| 2010/0142622 A1 | 6/2010 | Le Leannec | |
| 2010/0220789 A1 | 9/2010 | Yuwen | |
| 2011/0090959 A1 | 4/2011 | Wiegand | |
| 2011/0194618 A1 | 8/2011 | Gish | |
| 2011/0255589 A1* | 10/2011 | Saunders | H04N 19/176 |
| | | | 375/240.01 |
| 2012/0070081 A1 | 3/2012 | Lukac | |
| 2012/0236929 A1 | 9/2012 | Liu | |
| 2013/0039426 A1 | 2/2013 | Helle | |
| 2013/0148029 A1 | 6/2013 | Gish | |
| 2013/0187798 A1 | 7/2013 | Marpe | |
| 2013/0279577 A1 | 10/2013 | Schwarz | |
| 2013/0300591 A1 | 11/2013 | Marpe | |
| 2016/0189672 A1* | 6/2016 | Demos | G01J 3/02 |
| | | | 345/589 |

OTHER PUBLICATIONS

JVT Reference software Version H.264, Karsten Suhring, HHI.
Gao, Y. et al. "CE4: SVC bit-depth Scalability Simulation Results", Joint Video Team, Doc JVT-W 102, San Jose, CA, Apr. 2007.
Segall, A. et al. "System for bit-Depth Scalable Coding", Joint Video Team, Doc. JVT-W113, San Jose, CA, Apr. 2007.
Segall, A. "CE4: Verification JVT-W102 (Thomson Prop", Joint Video Team, Doc. JVT-W116, San Jose, CA, Apr. 2007.
Gao, Y. et al. "Simulation Results for CE2: SVC Bit-Depth Scalability" Joint Video Team, JVT-X051, Geneva, Switzerland, Jun. 2007.
Wu, Y. et al. "Study on Inter-Layer Prediction in Bit-Depth Scalability", Joint Video Team, JVT-X052, Geneva, Switzerland, Jun. 2007.
Winken, M. et al. "CE2: SVC Bit-Depth Scalability" Joint Video Team, JVT-X057, Geneva, Switzerland, Jun. 2007.
Gao, Y. et al. "AHG Report: SVC Bit Depth and Chroma Format" Joint Video Team, Doc. JVT-W010, San Jose, CA, Jan. 2007.
Segall, A. et al. "CE2: Inter-Layer Prediction for Bit-Depth Scalable Coding", Joint Video Team, JVT-X067, 24rd Meeting: Geneva, Switzerland, Jun. 29-Jul. 5, 2007.
Liu, S. et al. "Inter-Layer Prediction for SVC Bit-Depth Scalable Coding", Joint Video Team, JVT-X075, Geneva Switzerland, Jun. 2007.
Ye, Y. et al. "Improvements to Bit Depth Scalability Coding", Joint Video Team, JVT-Y048, Schenzhen, China, Oct. 2007.
Segall, A. "CE1: Bit-Depth Scalability", Joint Video Team, JVT-X30IrI, Geneva, Switzerland, Jun. 2007.
Park, S. et al. "Hybrid Scalable, Video Codec for Bit-Depth Scalability", Optical Engineering, vol. 48, No. 1, Jan. 20, 2009, pp. 017002-1-017002-8.
Kim, Byung-Gyu, et al "Fast Mode Decision Algorithm for Inter-Frame Coding in H.264 Extended Scalable Video Coding" International Symposium on Circuits and Systems, IEEE, May 24, 2009, pp. 2345-2348.
Chiang, Jui-Chiu, et al "Bit-Depth Scalable Video Coding Using Inter-Layer Prediction from High Bit-Depth Layer" IEEE International Conference on Acoustics, Speech and Signal Processing, NJ, USA, Apr. 19, 2009, pp. 649-652.
Tourapis, A. et al "A Frame Compatible System for 3D Delivery" MPEG Meeting, Geneva, Motion Picture Expert Group or ISO/IEC JTC1/SC29/WG11), Jul. 30, 2010.
Schwarz, H. et al. "Overview of the Scalable Video Coding Extension of the H.264/SVC Standard", IEEE Trans. on Circuits and Systems for Video Technology, vol. 17, No. 9, Sep. 2007.

* cited by examiner

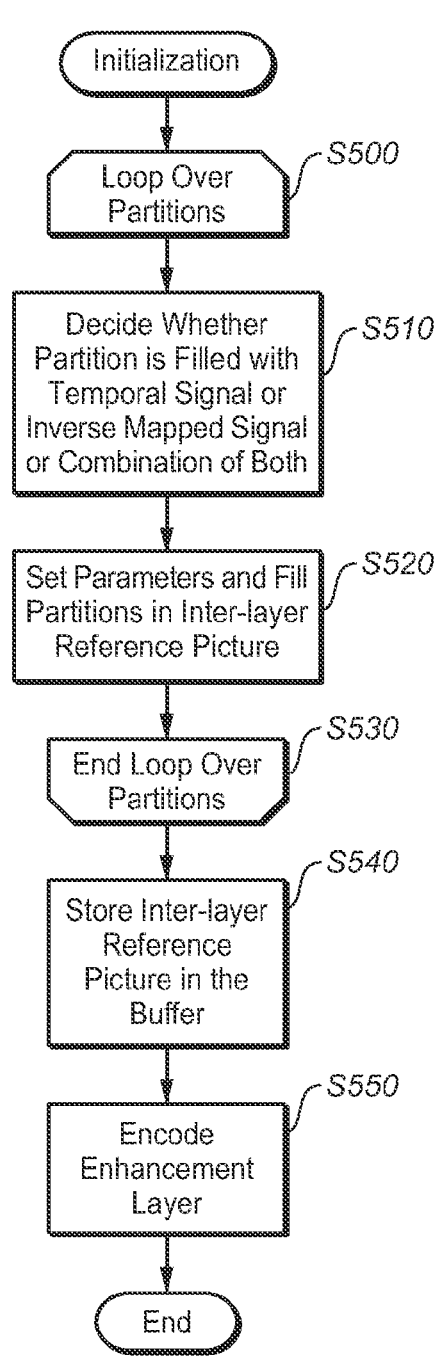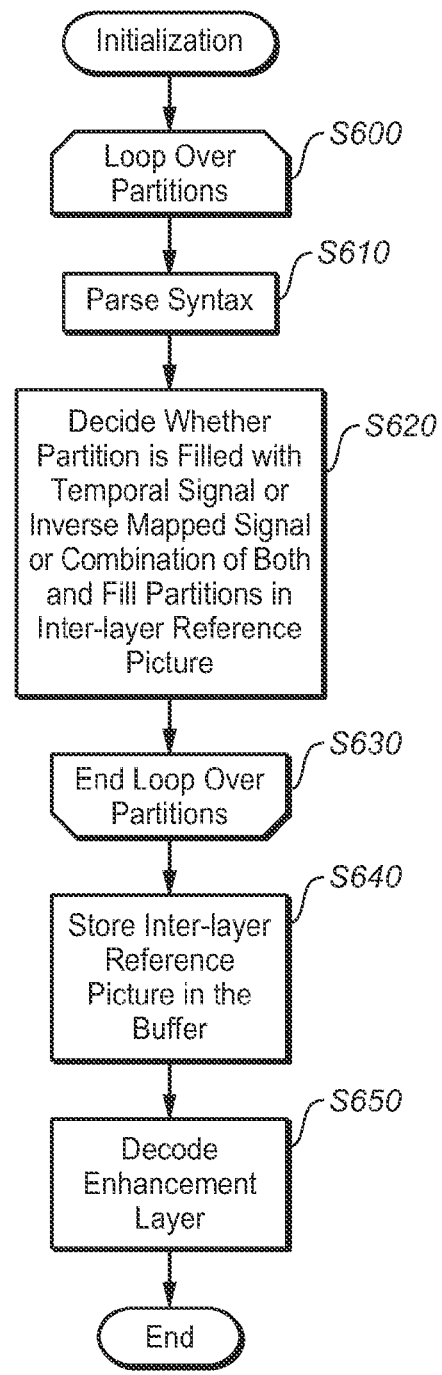
FIG. 5
FIG. 6

HYBRID REFERENCE PICTURE RECONSTRUCTION METHOD FOR SINGLE AND MULTIPLE LAYERED VIDEO CODING SYSTEMS

CROSS-REFERENCE TO RELATED APPLICATIONS

The present application is the U.S. National entry stage for PCT Application Ser. No. PCT/US2012/071086, filed on Dec. 20, 2012, which claims the benefit of priority from U.S. Provisional Patent Application Ser. No. 61/584,806, filed on Jan. 9, 2012, and U.S. Provisional Patent Application Ser. No. 61/584,805, filed on Jan. 9, 2012, the disclosure of each of which is incorporated herein by reference in its entirety.

TECHNICAL FIELD

The present invention relates to video coding. More particularly, an embodiment of the present invention relates to a hybrid reference picture reconstruction method for single and multiple layered video coding systems.

BRIEF DESCRIPTION OF DRAWINGS

FIG. 5 depicts a flowchart of encoding in accordance with embodiments of the present disclosure.

FIG. 6 depicts a flowchart of decoding in accordance with embodiments of the present disclosure.

DESCRIPTION OF EXAMPLE EMBODIMENTS

Figure 1:
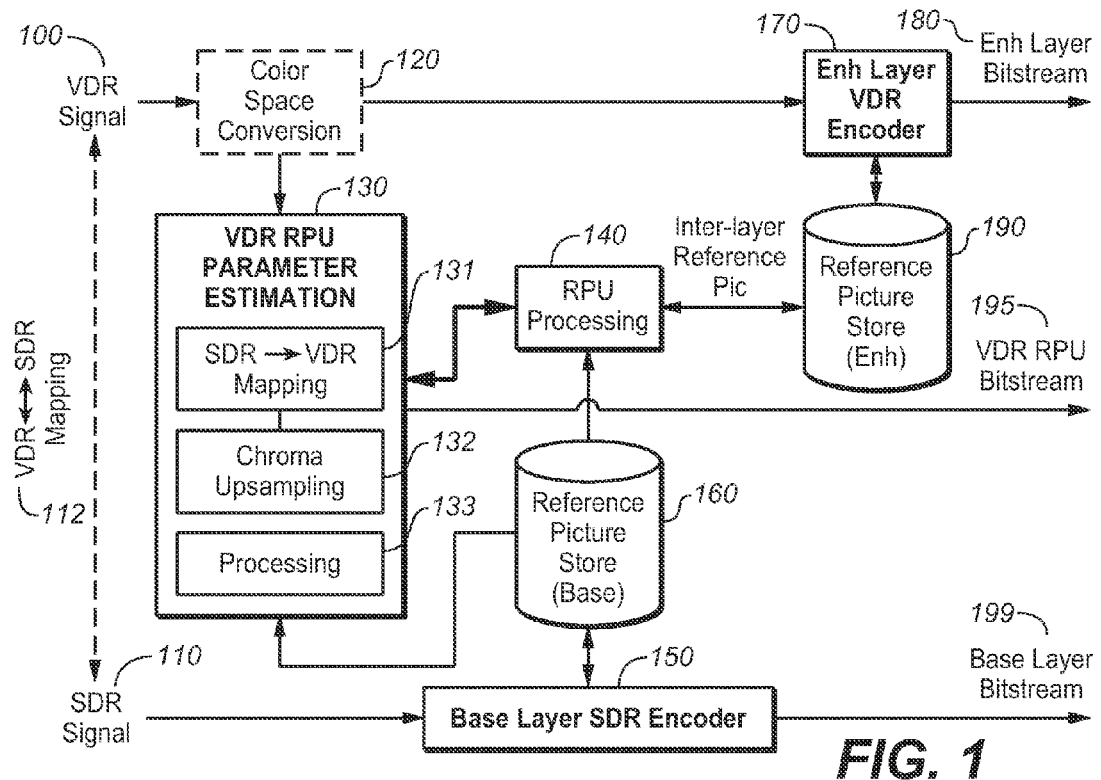
FIGS. 1 and 2 depict an example multi-layer encoding system and multi-layer decoding system, respectively.

As used herein, the term "Standard Dynamic Range" (SDR) may refer to a dynamic range corresponding to current standard video systems (e.g., ITU-T Rec. 709, sRGB, and so forth).

As used herein, the term "Visual Dynamic Range" (VDR) may refer to a perceptual upper bound for distributed content conveying full color gamut and bounded instantaneous dynamic range.

As used herein, the terms "position", "pixel position", and "pixel location" are used interchangeably.

As used herein, the term "original signal" may refer to a signal which is provided to a coding system (e.g., not derived from mapping or inverse mapping).

As used herein, the term "temporal signal" may refer to previously decoded pictures or a region of a previously decoded picture from a layer (e.g., base layer or enhancement layer) relative to a current signal under consideration.

As used herein, the term "quality level" may include, by way of example and not of limitation, metrics such as dynamic range, bitrate, and resolution, among other commonly accepted measures of quality.

As used herein, the terms "region" and "partition" are used interchangeably and may refer to a pixel, a block of pixels (such as a macroblock or otherwise any defined coding unit), an entire picture or frame, a collection of pictures/frames (such as a sequence or subsequence). Macroblocks can comprise, by way of example and not of limitation, 4×4, 8×8, and 16×16 pixels within a picture. In general, a region can be of any shape and size.

An example method of segmenting a picture into regions, which can be of any shape and size, takes into consideration image characteristics. For example, a region within a picture can be a portion of the picture that contains similar image characteristics. Specifically, a region can be one or more pixels, macroblocks, or blocks within a picture that contains the same or similar chroma information, luma information, and so forth. The region can also be an entire picture. As an example, a single region can encompass an entire picture when the picture in its entirety is of one color or essentially one color.

As used herein, the phrase "bit depth" may refer to number of bits associated with a particular signal (e.g., an image or region thereof). Each pixel in a lower dynamic range representation of an image is generally associated with a lower bit depth than each pixel in a higher dynamic range representation of the image. However, it may also be possible for two signals with differing dynamic ranges to have the same bit-depth. By way of example and not of limitation, consider a case with 8 bits per pixel. A lower dynamic range may allow pixel values of range [25, 205] whereas a higher dynamic range may allow pixel values of range [0, 255]. The dynamic ranges are different, but the number of bits per pixel is the same in the above example.

As used herein, the term "higher priority layer" may refer to a layer that is coded prior to the coding of the present layer. Consequently, the higher priority layer is available to provide inter-layer information for inter-layer prediction of the present layer.

As used herein, the term "first layer" is defined herein to refer to any layer, such as a base layer or an enhancement layer, whereas the term "second layer" is defined herein to refer to any layer of lower priority than the first layer. The first layer can be a base layer while the second layer can be an enhancement layer. Alternatively, the first layer can be an enhancement layer while the second layer can be another enhancement layer of lower priority than the first layer.

As used herein, the phrases "intra prediction" and "spatial prediction" are used interchangeably and may refer to utilizing already coded neighboring regions in the same video signal (e.g., picture, slice) to predict a current region of the video signal under consideration. Intra prediction may exploit spatial correlation and remove spatial redundancy inherent in the video signal. Spatial prediction may be performed on video regions of various sizes and shapes, although block based prediction is common. For example, H.264/AVC in its most common, consumer oriented profiles allows block sizes of 4×4, 8×8, and 16×16 pixels for spatial prediction of the luma component of the video signal and allows a block size of 8×8 pixels for the chroma components of the video signal.

As used herein, the phrases "inter prediction" and "temporal prediction" are used interchangeably and may refer to utilizing video regions from neighboring video frames from reference pictures stored in a reference picture buffer to predict a current video region. Inter prediction may exploit temporal correlation and remove temporal redundancy inherent in the video signal. An example of inter prediction comprises motion prediction. Similar to intra prediction, temporal prediction also may be performed on video regions of various sizes and shapes. For example, for the luma component, H.264/AVC allows inter prediction block sizes such as 16×16, 16×8, 8×16, 8×8, 8×4, 4×8, and 4×4.

According to several embodiments of the disclosure, inter-layer prediction systems and methods adapted for use in layered video coding systems are provided. Embodiments of the disclosure can be utilized, by way of example and not limitation, in Visual Dynamic Range (VDR) coding systems, Frame Compatible Full Resolution (FCFR) 3D coding systems, and layered coding systems such as bit depth scalable systems, dynamic range scalable systems, Scalable Video Coding (SVC) systems (see reference [1], incorporated herein by reference in its entirety) and Multiview Video Coding (MVC) systems. It is noted that VDR coding systems will be used as example coding systems that utilize inter-layer prediction systems and methods according to embodiments of the present disclosure. However, other coding systems can also utilize these inter-layer prediction systems and methods.

Figure 2:
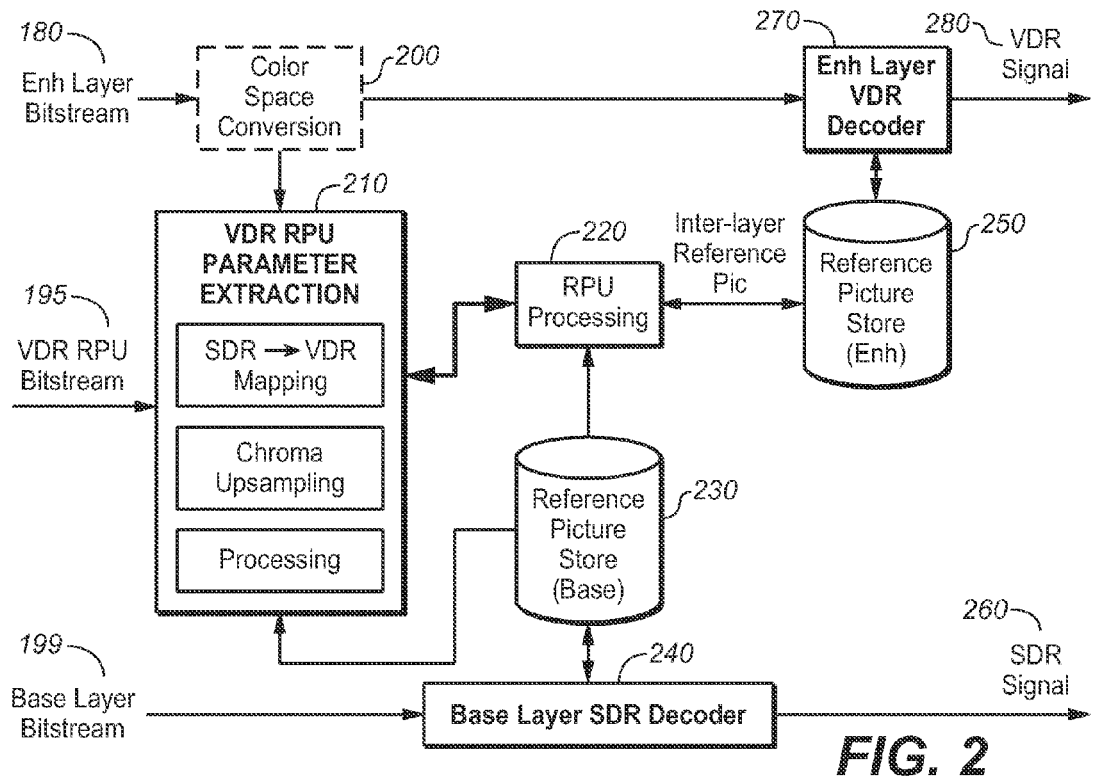
Figure 9:
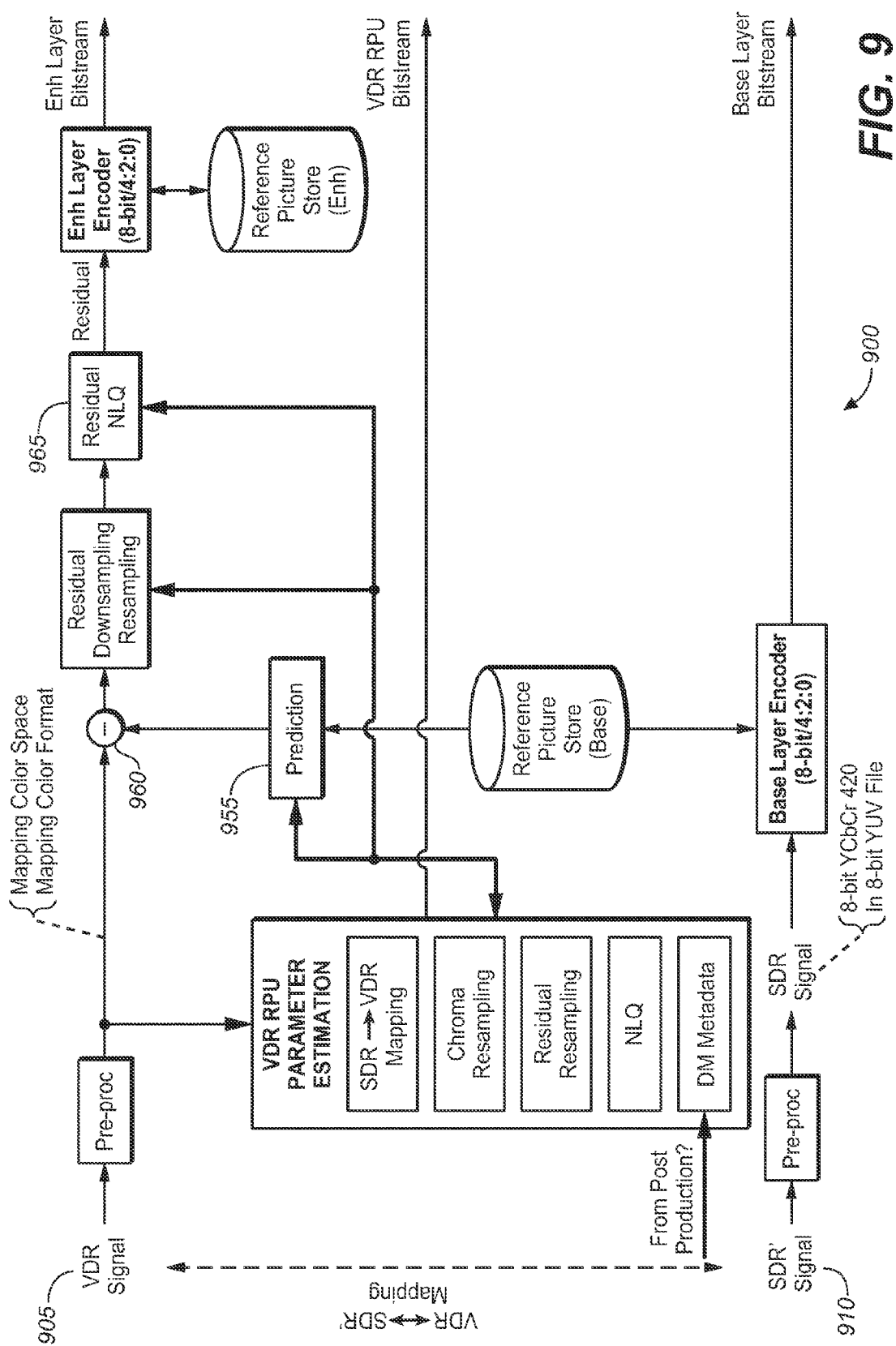
FIGS. 9 and 10 depict another example multi-layer encoding system and multi-layer decoding system, respectively.
Figure 10:
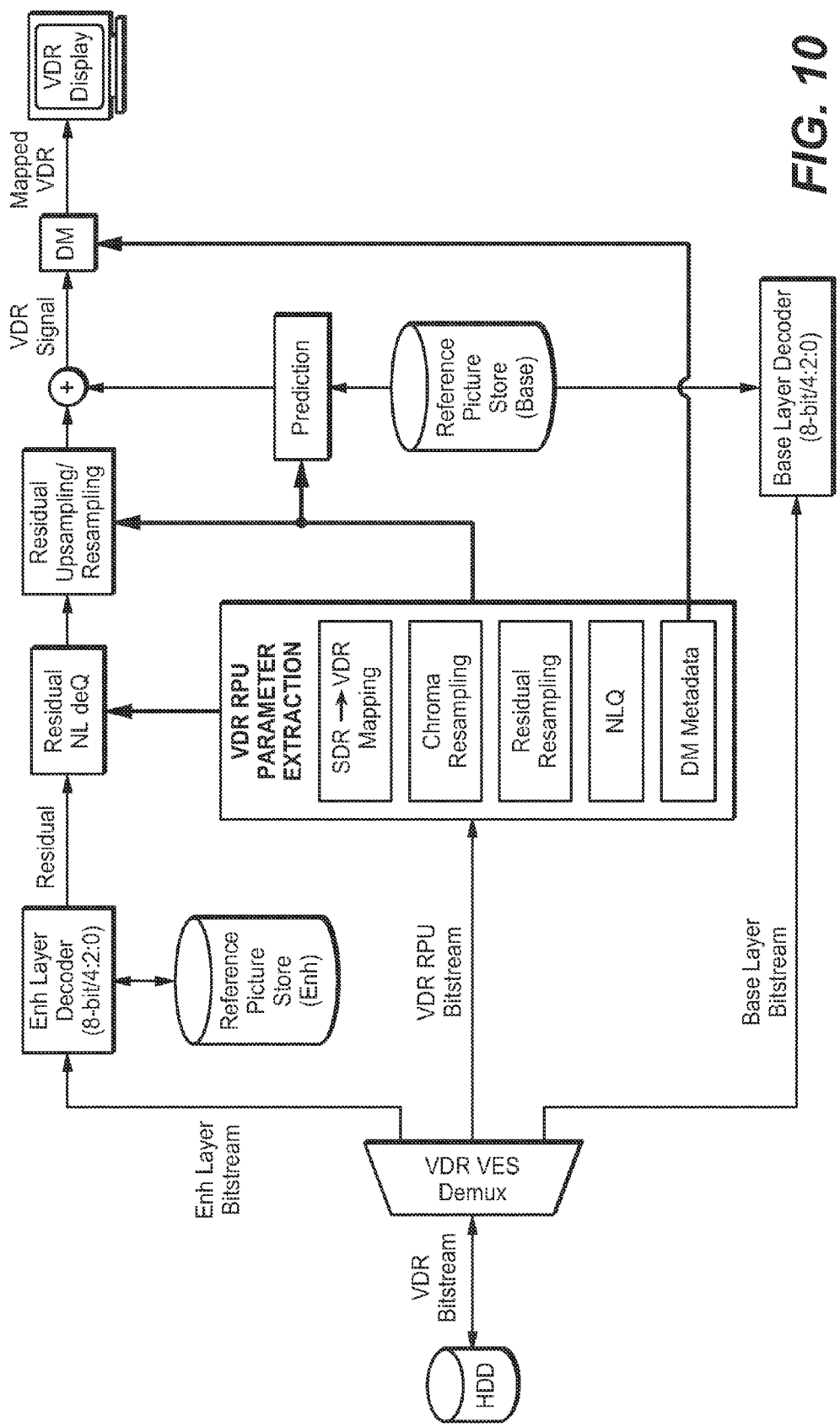

FIGS. 1 and 2 depict an example multi-layer encoding system and multi-layer decoding system, respectively. Specifically, FIGS. 1 and 2 depict an example VDR (Visual Dynamic Range) 2.x codec. FIGS. 9 and 10 depict another example multi-layer encoding system and multi-layer decoding system, respectively. Specifically, FIGS. 9 and 10 depict an example VDR 1.x codec. Each of FIGS. 1-2 and 9-10 depicts encoding/decoding systems comprising a base layer and an enhancement layer, where the base layer may contain image information having a lower quality level and the enhancement layer may contain image information having a higher quality. Encoders (150 and 170 in FIG. 1) and decoders (240 and 270 in FIG. 2) associated with each of the layers can be encoders and decoders such as motion compensated prediction video encoders and decoders (MPEG-2, H.264, and so forth).

With reference to FIG. 1, inter-layer prediction (130) in a VDR coding system can involve an inverse mapping process such as that performed by a bit depth scalable codec. In particular, an embodiment of the disclosure can generate (140) a reconstructed reference picture for use in inter-layer prediction.

In a VDR 2.x codec (such as depicted in FIG. 1 and FIG. 2), an inter-layer reference picture can be generated in an RPU (Reference Processing Unit) (140 in FIG. 1, 220 in FIG. 2) to be used in an enhancement layer for inter-layer prediction. In an example where a base layer is a 4:2:0 8 bits SDR (Standard Dynamic Range) signal and an enhancement layer is a 4:4:4 12 bits VDR signal, first chroma upsampling by interpolation is performed at the base layer from 4:2:0 8 bits to 4:4:4 8 bits, then inverse mapping (130 in FIG. 1, 210 in FIG. 2) is performed from the base layer 4:4:4 8 bits to the enhancement layer 4:4:4 12 bits to generate a picture. Afterwards, the generated picture can be stored in a reference picture buffer (190 in FIG. 1, 250 in FIG. 2) and can be used by the enhancement layer as an inter-layer prediction. The conversion (130 in FIG. 1, 210 in FIG. 2) from SDR to VDR, comprising chroma upsampling followed by inverse mapping, can be performed in the RPU (140 in FIG. 1, 220 in FIG. 2) and can have an impact on coding efficiency.

It should be noted that an original input to the encoding system can be, for instance, a VDR signal (100) captured by a camera, and this VDR signal (100) can be forward mapped (112) to an SDR signal (110) for compression and/or display purposes because many consumer devices are compatible with the SDR signal (110).

With continued reference to FIG. 1, the encoding system depicted in FIG. 1 is configured to receive video signals at a lower quality level (110) and a higher quality level (100). It should be noted that the lower quality level signal (110) can be inverse mapped (112) to generate the higher quality level signal (100) or, alternatively, the higher quality level signal (100) can be forward mapped (112) to obtain the lower quality level signal (110).

Prior to encoding of the higher quality level signal (100) by the enhancement layer encoder (170), a color space conversion (120), which is optional, may be performed by a color space conversion module (120) to convert the higher quality level signal (100) from one color space (e.g., an input color space) to another color space (e.g., an encoding color space). For example, the color space conversion (120) can convert from an XYZ/RGB color space associated with the higher quality level signal (100) to a YCbCr color space for encoding purposes. Losses may occur during the color space conversion (120) due to rounding operations. The encoding color space is generally selected for coding efficiency at the enhancement layer encoder (170), where the encoding color space can be associated with higher coding efficiency than the input color space.

The base layer encoder (150) is configured to encode and reconstruct the lower quality level signal (110) while the enhancement layer encoder (170) is configured to encode and reconstruct the higher quality level signal (100). Reconstructed base layer pictures can be stored in a base layer reference picture buffer (160). Base layer reference pictures can be utilized for prediction of base layer information and/or generation of an inter-layer reference picture, where the inter-layer reference picture can be stored in an enhancement layer reference picture buffer (190) and can be used for prediction (e.g., motion estimation/compensation) of the enhancement layer.

Base layer reference pictures from the base layer reference picture buffer (160) can be processed using an RPU (140). The RPU (140) processes the base layer reference pictures based on parameters estimated by an RPU parameter estimation module (130). The RPU parameter estimation module (130) can estimate, by way of example and not of limitation, inverse mapping parameters (131), chroma upsampling parameters (132), and various other processing parameters (133) such as deblocking or decontouring parameters.

The RPU parameter estimation module (130) can be configured to estimate such parameters based on the base layer reference pictures and an original (or optionally color space converted) enhancement layer signal. For instance, the RPU parameter estimation module (130) can be configured to apply different possible parameters (131, 132, 133) to a base layer reference picture to predict an enhancement layer picture. A selection of parameters (131, 132, 133) can be made by computing one or more costs (e.g., distortion cost, rate-distortion cost, and so forth) based on a difference between the predicted enhancement layer picture and the original (or optionally color space converted) enhancement layer signal. Generally, a set of parameters (131, 132, 133) associated with a lowest cost is selected. The RPU parameter estimation module (130) can also be configured to encode and signal these parameters to a decoding system such as the decoding system depicted in FIG. 2.

It should be noted that although the phrases "standard dynamic range" and "visual dynamic range" are utilized, the phrases may refer to any lower dynamic range signal and higher dynamic range signal, respectively. Additionally, the lower dynamic range signal may be, but need not be, 8 bits while the higher dynamic range signal may be, but need not be, 12 bits.

By way of example and not of limitation, in FIG. 9, the enhancement layer encoder can be an 8 bit encoder similar to the 8 bit base layer encoder. For instance, FIG. 9 depicts an encoding system (900) that comprises a base layer associated with SDR signals (910) and an enhancement layer associated with VDR signals (905). The VDR signals (905) can have higher bit depth (e.g., 10 bits or 12 bits) than the SDR signals (910). A higher bit depth signal can be predicted (915) based on reconstructed SDR signals of the base layer, and a residual can be computed between the predicted higher bit depth signal and a corresponding VDR signal from the original (or optionally pre-processed) VDR signals (905). The residual can then be quantized (965) to convert from the higher bit depth to an 8 bit residual to be encoded by the 8 bit enhancement layer encoder. The inverse mapping methods can be the same for both FIG. 1 and FIG. 9.

Figure 11:
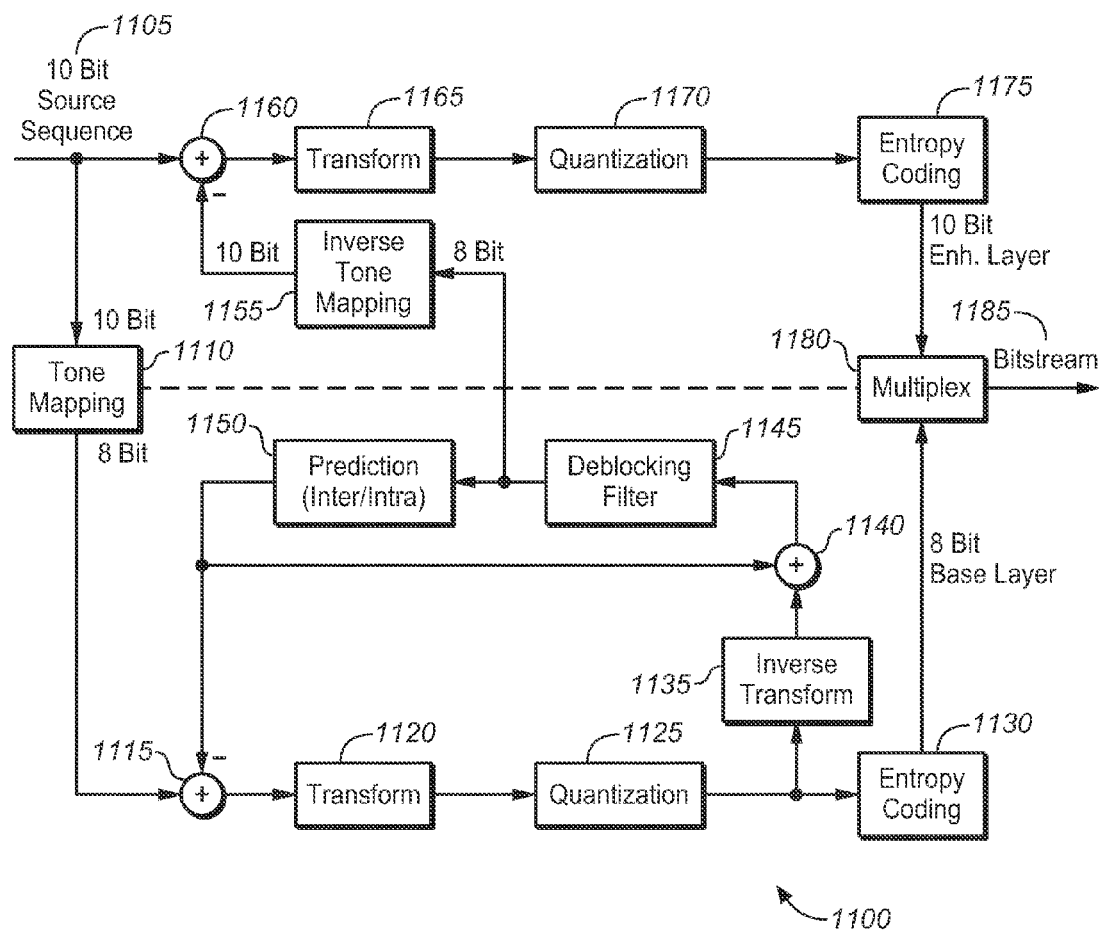
FIG. 11 depicts an example bit depth scalable encoding system.

FIG. 11 depicts an example bit depth scalable encoding system (1100) that comprises a base layer and an enhancement layer. Specifically, the example bit depth scalable encoding system (1100) provides a base layer associated with 8 bit image information and an enhancement layer associated with 10 bit image information.

An input to the bit depth scalable encoding system (1100) may comprise a 10 bit source sequence (1105). The 10 bit source sequence (1105) can be forward mapped (1110) to an 8 bit sequence representative of the base layer. At the base layer, images in the 8 bit sequence can be subtracted (1115) via a arithmetic operation module (1115) from corresponding inter or intra predicted base layer images to generate base layer residual information. The base layer residual information may then be transformed (1120) and quantized (1125) to generate base layer quantized transform residual information, which can be entropy coded (1130) to generate an 8 bit base layer bitstream.

The quantized transform residuals can also be inverse transformed and quantized (1135) and then added, via an arithmetic operation module (1130), to the predicted base layer images to generate reconstructed base layer images. The reconstructed base layer images can be optionally deblocked (1145) by applying a deblocking filter (1145) to the reconstructed base layer images. Deblocking (1145) may be performed to remove artifacts (e.g., block artifacts) in the reconstructed base layer images due to region-based operations (e.g., block-based operations) generally performed on the base layer sequence.

The reconstructed (and optionally deblocked) base layer images, which in the example above comprise 8 bit image information, can be inverse mapped (1155) to generate predicted 10 bit enhancement layer images. The predicted enhancement layer images can be subtracted from the original 10 bit source sequence (1105), via an arithmetic operation module (1160), to generate enhancement layer residual information. The enhancement layer residual information can be transformed (1165) and quantized (1170) to generate quantized transform enhancement layer residual information, which can be entropy coded (1175) to generate a 10 bit enhancement layer bitstream.

The 8 bit base layer bitstream and the 10 bit enhancement layer bitstream can be sent to a decoding system as separate bitstreams or as a single bitstream (1185). The single bitstream (1185) can be obtained from multiplexing (1180), via a multiplexer (1180), the base and enhancement layer bitstreams to generate the single bitstream (1185). It should be noted that the bitstream or bitstreams can also signal to a decoding system processing parameters associated with each layer such as transformation parameters utilized by transformation modules (1120, 1165), quantization parameters utilized by quantization modules (1125, 1170), and prediction parameters utilized by inter and/or intra prediction module (1150). A decoding system may be configured to decode the bitstream or bitstreams from the encoding system (500) based on information (e.g., processing parameters) signaled by the encoding system (1100).

Although each of the encoding and decoding systems depicted previously comprises one base layer and one enhancement layer, additional base layers and/or enhancement layers can be implemented. For instance, a dynamic range scalable codec may comprise a base layer associated with image information having a first dynamic range, a first enhancement layer associated with image information having a second dynamic range, and a second enhancement layer associated with image information having a third dynamic range (and possibly more base layers and/or enhancement layers), where the second and third dynamic ranges can be of higher dynamic range than the first dynamic range. As another example, a bit depth scalable codec may comprise a base layer associated with image information at, for instance, 8 bits per pixel and at least a first and a second enhancement layer associated with image information at, for instance, 10 bits per pixel. The embodiments of the present disclosure can also be utilized in various other scalable codecs.

Figure 3:
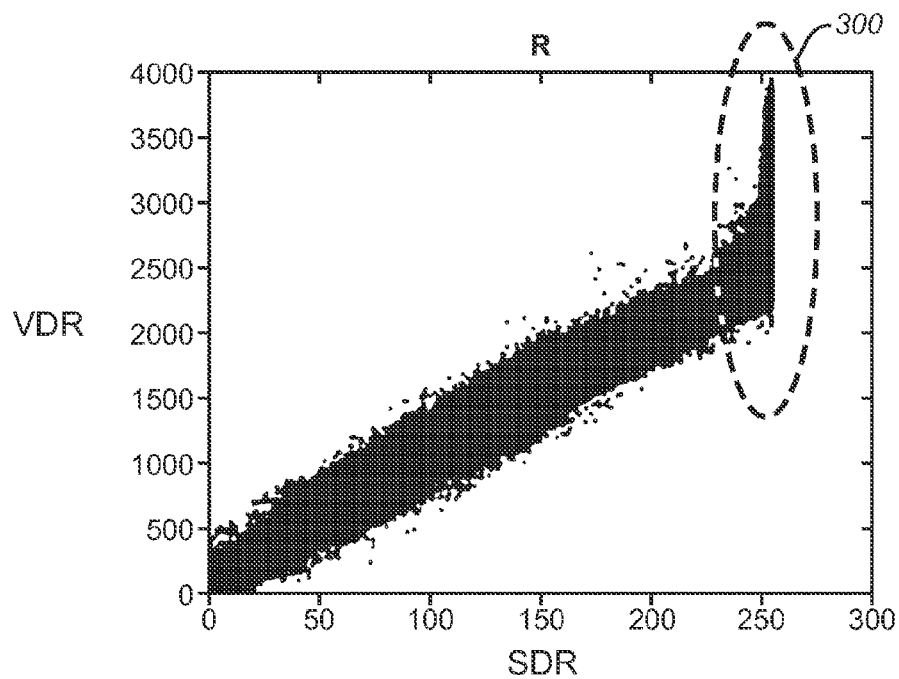
FIG. 3 depicts an inverse mapping from SDR (Standard Dynamic Range) to VDR (Visual Dynamic Range).

Many methods have been proposed for inverse mapping, such as polynomial mapping (including linear mapping), table lookup, multivariate multiple regression (MMR), slope offset power (SOP) (see references [2], [3], and [17], incorporated herein by reference in their entireties), and so forth. But as depicted in FIG. 3, it may be difficult to map data from SDR to VDR in some data range, for example, a dark or especially a bright range (300), where a mapping plot is almost a vertical line and the SDR signal is almost saturated. But if a temporal neighbor or neighbors of data/pixels that fall within some data range that may be difficult to map from one dynamic range to another dynamic range are considered, the mapping may be facilitated.

Figure 4:
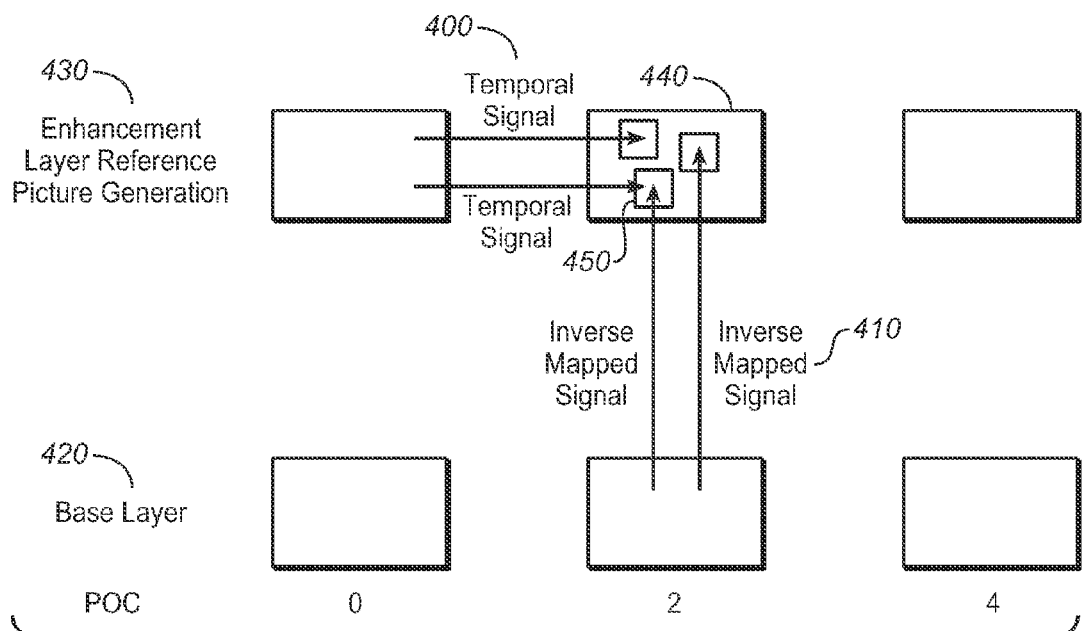
FIG. 4 depicts a method of generating an enhancement layer picture in accordance with embodiments of the present disclosure.

FIG. 4 depicts an example method for generating inter-layer reference pictures. The method can consider information not only from a processed signal in a base layer (420) but also temporal information (400) from one or more enhancement layer reference pictures (430). The processed signal in the base layer (420) can comprise coded base layer images whereas the temporal information (400) from the one or more enhancement layer reference pictures (430) can comprise previously coded enhancement layer images. Information from different layers (420, 430) can be fused together to construct a picture that can be utilized as a reference for the enhancement layer (430).

It should be noted in FIG. 4 "POC (picture order count)" may refer to a variable that is associated with each coded field and each field of a coded frame and has a value that is non-decreasing with increasing field position in output order relative to a first output field of a previous IDR (instantaneous decoding refresh) picture in decoding order or relative to the first output field of a previous picture, in decoding order, that contains a memory management control operation that marks all reference pictures as "unused for reference".

By way of example and not limitation, an H.264/AVC [4] based VDR 2.x codec can be considered, but the disclosure can also be applied to other bit-depth scalable codecs

[5]-[15] (each of which is incorporated herein by reference in its entirety) or combined with other coding standard such as MPEG-2, HEVC, and so forth.

According to several embodiments of the present disclosure, an inter-layer reference picture (440) can be filled by either a(n) (inverse) mapped SDR signal (410) of a current picture from the base layer (420) or a temporal signal (400) from previously decoded pictures in the enhancement layer (430), or both SDR signals (410) and temporal signals (400) can be used in conjunction with each other. An inter-layer reference picture (such as 440) can be segmented at a region level (e.g., macroblock, block of pixel or pixels, an entire picture, and so forth), where each of these segments can be filled according to one or more of the methods of the present disclosure.

In one embodiment, for each region defined in the inter-layer reference picture (440), it may be possible to specify that a particular region be generated based on information from the (inverse mapped) base layer signal (410), from the temporal signal (400), or a combination of information from the base layer (410) and from the temporal signal (400).

FIG. 4 depicts an example of biprediction. Specifically, FIG. 4 depicts an inter-layer reference picture (440) where one of the regions (e.g., 450) can be filled using information from both an inverse mapped signal (410) and a temporal signal (400). It should be noted that the term "biprediction" may refer to using both an inverse mapped signal together with a temporal signal, as depicted in FIG. 4, or may also refer to using multiple temporal signals together and/or multiple inverse mapped signals together to generate a particular inter-layer reference picture or a region thereof.

It should be noted that in some codecs, such as those depicted in FIGS. 1 and 2, an inter-layer reference picture (such as 440 in FIG. 4) can be put in a first position (denoted as reference_index=0), where a reference index equal to 0 usually requires fewer bits to code than other reference index numbers. By processing a reference picture associated with reference index 0 to better resemble the VDR signal in the enhancement layer, more regions in the enhancement layer may select the same reference picture that is associated with a reference index of 0, which can yield a reduction in number of bits used to code the reference index. If this reference picture is good enough, it becomes possible to use only one reference picture for the list. Roughly speaking, if the coding efficiency of one reference picture is almost similar to multiple reference pictures, it is possible to say that this one reference picture is good enough. In a case where only one reference picture exists in that list, the reference picture to utilize need not be specified, and thus bits need not be spent coding a reference index.

According to several embodiments of the present disclosure, a decision is generally made regarding which temporal signal (400) from among a plurality of temporal signals should be utilized for generating a region of the inter-layer reference picture because there might be temporal movement involved. There are several possible ways make such a decision.

In one embodiment, the enhancement layer temporal signal (400) can be copied from a collocated position in a previously decoded enhancement layer picture to a collocated position in the inter-layer reference picture, assuming a motion vector that comprises a zero vector. In another embodiment, a motion compensated enhancement layer temporal signal can be copied. Specifically, a motion vector associated with the enhancement layer temporal signal (400) can be applied to the enhancement layer temporal signal (400) to generate the motion compensated enhancement layer temporal signal. Although enhancement layer temporal signals depicted in FIG. 4 are from previously decoded enhancement layer images, inverse mapped temporal signals from previously decoded base layer images can also be utilized.

In one embodiment, the motion vector can be signaled explicitly to a decoder as part of a bitstream. The motion vector can be in full precision (e.g, quarter pel) or reduced precision (e.g., integer pel) to provide a tradeoff between distortion and bitrate cost, where integer pel or quarter pel precision is relative to pixels in the enhancement layer. In another embodiment, the collocated motion vector from the base layer (420) can be used, where the motion vector may be scaled based on the relative resolution ratio between the base layer (420) and the enhancement layer (430). This embodiment refers to applying a (scaled) motion vector of the base layer to the enhancement layer temporal signal to form a motion compensated enhancement layer temporal signal, where the scaled motion vector is associated with a position (x, y) of the base layer signal and is applied to the same position (x, y) of the enhancement layer temporal signal being motion compensated. An inter-layer motion prediction process as defined in H.264/AVC extension SVC process can be used when the base layer region is an inter-predicted region, that is, when the base layer region is being generated from inter (temporal) prediction within the base layer and a corresponding base layer motion vector may exist (see reference [1], incorporated by reference herein in its entirety). If the base layer (420) region is an intra-predicted region, the motion vector can be assumed to be a zero vector or can be interpolated from neighboring regions. The above methods can be combined together.

In one embodiment, the above methods can be used selectively for each region. Consequently, explicit MVs (motion vectors) can be used for some regions while a prediction from motion information associated with the base layer (420) can be used directly for other regions. In another embodiment, both explicit motion vectors and the prediction from the motion information associated with the base layer (420) can be used for the same region and two pixel values, one pixel value corresponding to explicit motion vectors associated with the enhancement layer reference pictures (430) and one pixel value corresponding to the prediction from motion information associated with the base layer (420), can be averaged to yield a more robust value for reference. A rate-distortion cost for each mode that is performed including using explicitly signaled motion information only, base layer (420) motion information only, and combining both types of motion information can be determined by Equation (1). In general, a mode associated with a lowest cost can be selected.

$$\text{Distortion}(m) = \text{Distortion}(\text{Orig}, \text{Prediction}(m)) + \text{Lambda} * \text{Rate}(m) \qquad (1)$$

In Equation (1), m refers to mode of picture generation or picture region generation, Lambda refers to the weight to bias between distortion and rate, Orig refers to the original VDR signal (e.g., an original VDR image or a region of an original VDR image), Prediction(m) refers to the constructed value of a corresponding image or region according to mode m, and Rate(m) refers to a number of bits only used to signal the mode m (e.g., number of bits used for encoding or signaling the mode m) to the decoder. The distortion can be computed based on different error metrics such as SSE (sum of squared errors), SAD (sum of absolute differences), or SATD (sum of absolute transform differences), among others.

Once processing has been performed using both the enhancement layer temporal signal (400) and SDR mapped signal (410) to generate corresponding intermediate results (e.g., intermediate pictures or regions thereof), a decision can be made as to which signal will be used to fill the inter-layer reference. In one embodiment, a 1 bit flag can be used to indicate which method is to be used. The unit for specification can be an macroblock or a partition or a region. At an encoder, the rate-distortion cost (see reference [16], incorporated by reference herein in its entirety) of using enhancement layer temporal signal (400) and SDR mapped signal (410) can be compared, and the method which has the lower cost can be selected. In another embodiment, the decision can be based on signal characteristics from the base layer (420). Alternatively, the rate-distortion cost of using an enhancement layer temporal signal (400), inverse mapped SDR signal (410), and a signal comprising an average of the enhancement layer temporal signal (400) and the inverse mapped SDR signal (410) can be compared, and a mode (generally the mode associated with the lowest cost) can be selected.

The decision can also be made based on the statistics of the signals, such as mean, variance, edge or texture indicators. In one example, a mean of a macroblock or a region of base layer signal (410) can be computed. If the mean is in between a pair of threshold pixel values (threshold_1 and threshold_2), which means that the signal is in a defined range, the SDR mapped signal (410) can be used. Otherwise, the temporal predicted signal (400) can be used. Threshold pixel values can be trained beforehand or adjusted by analyzing data for a sequence, a scene, a GOP, and so forth. Referring back to FIG. 3, and by way of example and not of limitation, threshold_1 can be set at 50 and threshold_2 can be set at 200. For instance, for an unsigned 8 bit integer, pixel values between 50 and 200 inclusive can be defined as the middle range whereas pixel values below 50 and above 200 are outside of the middle range.

As a further example, a mean or other statistic of a macroblock or a region of the base layer signal (410) may fall within one of a plurality of ranges, where each range is bounded by a pair of threshold pixel values. In this case, the inverse mapped signal (410) can be selected to fill the region within the enhancement layer reference picture (440) to be generated.

At a decoder, the decoder can parse the syntax to determine the decision made by the encoder and reconstruct the reference picture. Specifically, at the decoder, after parsing the syntax, the decoder decides whether a given macroblock/region/partition was filled with an enhancement layer temporal signal or an inverse mapped signal or a combination of both and fill partitions in an inter-layer reference picture.

Embodiments of the disclosure can be used with bit-depth scalable video codec that can be adapted to reconstruct both base layer and enhancement layer signals. For a single loop decoding case such as SVC coding, if the single loop is at the base layer [10], embodiments of the disclosure can be used as presented, where the term "single loop" may refer to reconstructing an inter-coded region only at one layer. If the single loop is at the enhancement layer [5], inverse mapping can only be used for the regions which are intra-predicted at the base layer, because inter-predicted regions will only be reconstructed at the enhancement layer and not at the base layer.

An example of RPU syntax is depicted in Table 1 and Table 2.

TABLE 1

RPU Header Syntax

| rpu_data_header( ) { | C | Descriptor |
|---|---|---|
| num_x_partitions_minus1 | 0 | ue(v) |
| num_y_partitions_minus1 | 0 | ue(v) |
| temporal_info_idc_pic | 0 | ue(v) |
| explicit_partition_flag | 0 | u(1) |
| } | | |

TABLE 2

RPU Data Payload

| vdr_rpu_data_payload( ) { | C | Descriptor |
|---|---|---|
| for ( y = 0; y <= num_y_partitions_minus1; y + +) { | | |
|   for ( x = 0; x <= num_x_partitions_minus1; x + +) { | | |
| if(temporal_info_idc_pic ==3) | | |
|   temporal_info_idc | 0 | ue(v) |
| else | | |
|   temporal_info_idc = temporal_info_idc_pic | | |
|     if ( temporal_info_idc == 1 \|\| | | |
|     temporal_info_idc == 2) { | | |
|       mv_x | 0 | se(v) |
|       mv_y | 0 | se(v) |
|     } | | |
|     if ( explicit_parition_flag == 1) | | |
|       use_temporal _idc | 0 | ue(v) |
|   } // x | | |
| } // y | | |
| } | | |

In an RPU header, which method to be used to derive the motion information for the enhancement layer temporal signal (400) and which method to be used for signaling a partition can be indicated. In an RPU payload, an indication is provided as to whether the partition is filled with the enhancement layer temporal signal (400) or an inverse mapped signal (410) or a combination of both signals. If the partition is filled with the enhancement layer temporal signal (400) only, motion information can be based on a temporal signal derivation method.

temporal_info_idc_pic is a signal for a whole picture. temporal_info_idc_pic equal to 0 specifies that a enhancement layer temporal signal (400) is copied from a collocated position of a reference picture at a closest temporal distance in the enhancement layer (430). temporal_info_idc_pic equal to 1 specifies that a enhancement layer temporal signal (400) is copied at the enhancement layer (430) from a smallest temporal reference index (excluding the reference picture from RPU) in LIST_0 with explicit MV. temporal_info_idc_pic equal to 2 specifies that a enhancement layer temporal signal (400) is copied at the enhancement layer (430) with a derived MV from the base layer (420). temporal_info_idc_pic equal to 3 specifies that each region will have its own temporal_info_idc flag.

temporal_info_idc equal to 0 specifies that a enhancement layer temporal signal (400) is copied from the collocated position of a closest reference picture in the enhancement layer (430). temporal_info_idc equal to 1 specifies that a enhancement layer temporal signal (400) is copied at enhancement layer (430) from a smallest temporal reference index (excluding the reference picture from RPU) in LIST_0 with explicit MV. temporal_info_idc equal to 2 specifies enhancement layer temporal signal is copied at the enhancement layer (430) with a derived MV from the base layer (420).

explicit_partition_flag equal to 1 specifies that one flag is used for each partition to indicate whether an enhancement layer temporal signal (400), an inverse mapped signal (410), or a combination of the signals (400, 410) is used to fill an inter-layer reference picture (440). explicit_partition_flag equal to 0 specifies using signal characteristics from the base layer (420) to derive whether an enhancement layer temporal signal (400) or an inverse mapped signal (410) is used to fill inter-layer reference picture (440).

use_temporal_idc equal to 0 specifies that an inverse mapped signal (410) is utilized to fill the enhancement layer reference picture (430). use_temporal_idc equal to 1 specifies that an enhancement layer temporal signal (400) is utilized to fill the enhancement layer reference picture (430). use_temporal_idc equal to 2 specifies that a combination of an inverse mapped signal (410) and an enhancement layer temporal signal (400) is utilized to fill the enhancement layer reference picture (430).

Examples of encoder and decoder flowcharts are depicted in FIG. 5 and FIG. 6. With reference to FIG. 5, for each partition, first a decision can be made (S510) as to whether the partition can be filled with an enhancement layer temporal signal or an inverse mapped signal or the combination of both. Next, parameters can be set and the partition can be filled as appropriate (S520). This process can be repeated (S500, S530) until all partitions in an inter-layer reference picture are filled. The resulting inter-layer reference picture can then be stored (S540) in a buffer. The enhancement layer can be encoded (S550) based on the resulting inter-layer reference picture.

With reference to FIG. 6, syntax of a RPU header file can be parsed (610). Next, based on the parsing result, a decision can be made (S620) as to whether the partition was filled with an enhancement layer temporal signal or an inverse mapped signal or the combination of both at an encoding side and signaled to a decoding side. This process can be repeated for all partitions (S600, S630). The resulting inter-layer reference picture can be stored (S640) in a buffer. The enhancement layer can be decoded (S650) based on the resulting inter-layer reference picture.

Embodiments of the disclosure can also be applied to a single layer codec. If there are multiple reference pictures in the reference list, then the new reference picture can be generated with previous reference pictures. RPR (Reference Picture Reconstruction) information can be transmitted to a decoder as metadata information or encapsulated in RPU. The reference picture reconstruction is based on region/partition.

For each region, a decision can be made regarding which reference picture should be used to fill the region. In one example, consider that there are three reference pictures and that there are regions in a new reference picture to be generated. Region 1 can be filled with data from reference picture indicated with reference index 0, region 2 can be filled with reference picture data indicated with reference index 1, and region 3 can be filled with reference picture data indicated with reference index 2. Alternatively, more than one of the regions can utilize the same reference picture and/or more than one of reference picture can be utilized to fill one region. Each region can use a different filling method as explained above.

Any and all of the previously described methods may be used by an RPR to construct a reference picture. By way of example and not of limitation, the reference picture to be generated may be segmented into one or more regions. For each region, multiple versions of the region of the reference picture to be generated can be generated. Each version can be based on different previously decoded pictures. The region of the reference picture to be generated may be filled either by selecting one version among the multiple versions of the region or by combining two or more of the multiple versions (e.g., weighted average). This process can be repeated for every region of the reference picture to be generated. The version of the region that is selected for filling of the reference picture can be selected based on computing a cost (e.g., rate-distortion cost) associated with each of the versions. The selected version of the region generally corresponds to the lowest computed cost.

Figure 7:
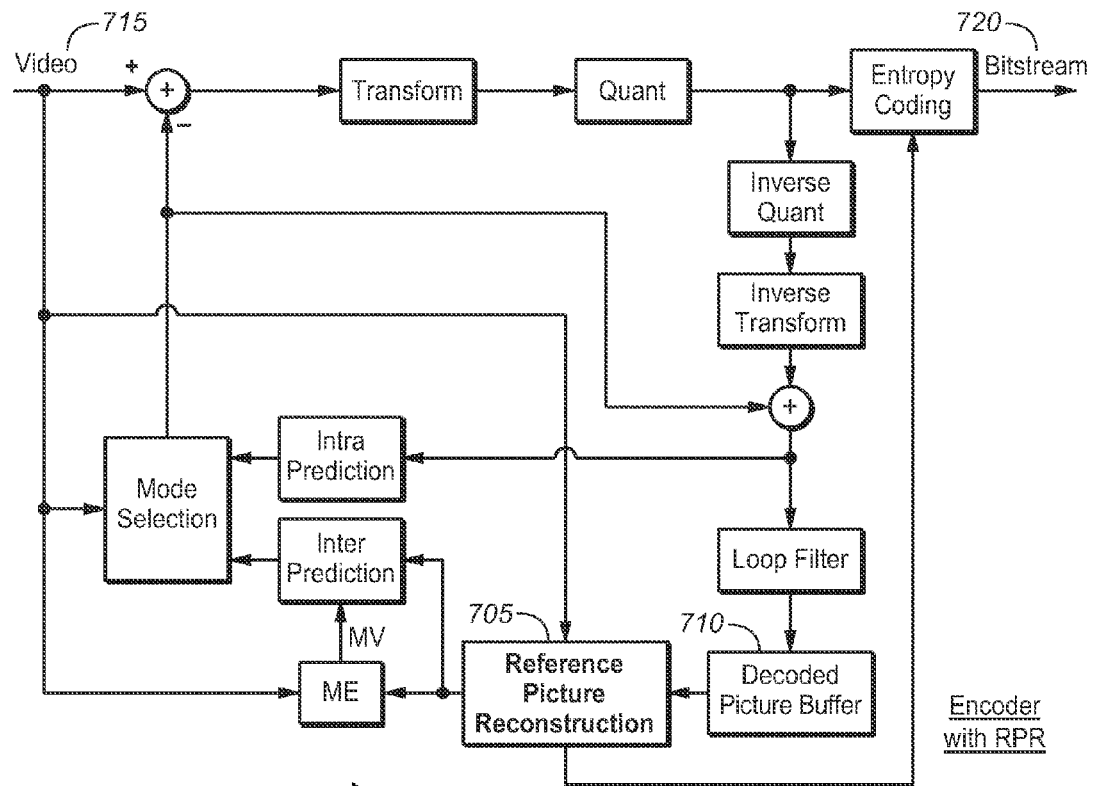
FIGS. 7 and 8 depict a single layer video coded with reference picture reconstruction.
Figure 8:
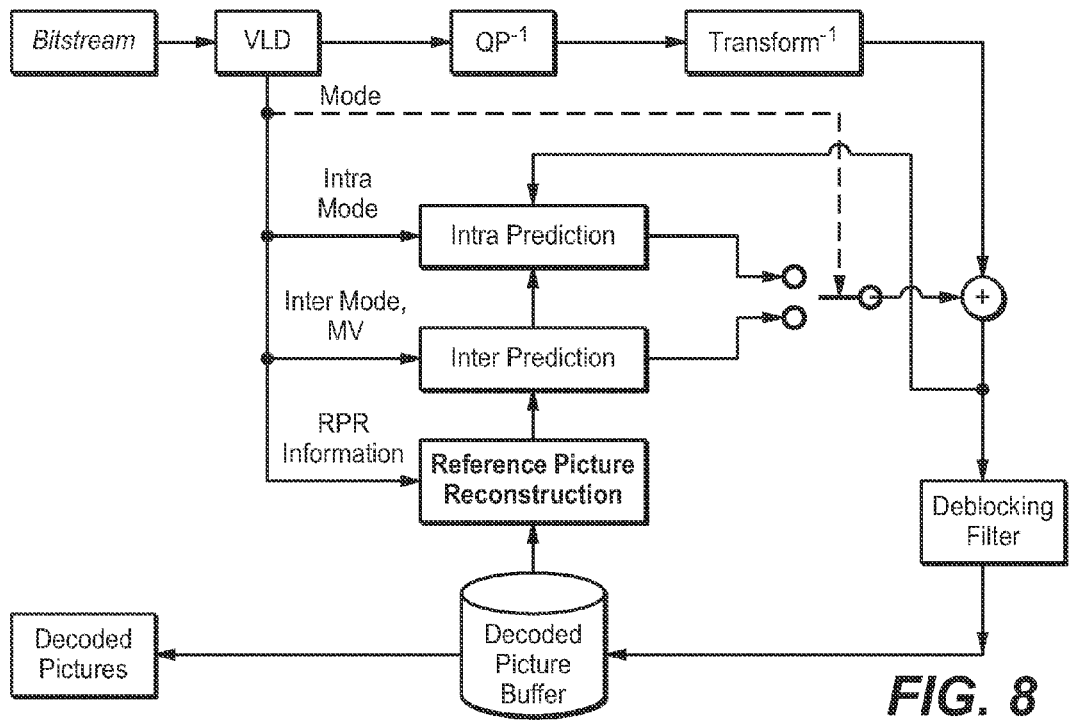

The motion information of a temporal neighboring picture can be used as implicit motion information for motion information derivation, such as motion scaling according to temporal distance. For explicit mode, the motion information of one region can be sent to reduce overhead. Each reference picture can be refined by an RPR module. An original reference picture (e.g., a reference picture from a reference picture buffer that has not been processed by a RPR) can be regarded as a reference picture from the base layer in a layered codec, and other reference pictures can be regarded as temporal references from the enhancement layer in the layered codec. FIG. 7 and FIG. 8 depict the encoder and decoder with RPR functionalities.

FIG. 7 depicts an encoding system (700) comprising a reference picture reconstruction module (705). The reference picture reconstruction module (705) is configured to generate a reference picture, where each region (e.g., any coding unit such as macroblock, block, slice, picture, and so forth) is filled based on information from one or more previously decoded picture stored in a buffer (710). The new reference picture to be generated by the reference picture reconstruction module (705) can be generated based on the various embodiments previously described in the present disclosure. The new reference picture can be used for prediction of image information (715) provided to the encoding system (700). Encoding of the image information (715) into one or more bitstreams (720) can be based on the new reference picture. Information associated with generating the new reference picture can be signaled to a decoding system, such as the decoding system depicted in FIG. 8, for use at the decoding side to decode the bitstream or bitstreams received from the encoding system.

The methods and systems described in the present disclosure may be implemented in hardware, software, firmware, or combination thereof. Features described as blocks, modules, or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

The examples set forth above are provided to give those of ordinary skill in the art a complete disclosure and description of how to make and use the embodiments of the hybrid reference picture reconstruction method for single and multiple layered video coding systems of the disclosure, and are not intended to limit the scope of what the inventors regard as their disclosure. Modifications of the above-described modes for carrying out the disclosure may be used by persons of skill in the video art, and are intended to be within the scope of the following claims.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a", "an", and "the" include plural referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

LIST OF REFERENCES

[1] H. Schwarz, D. Marpe, T. Wiegand, "Overview of the Scalable Video Coding Extension of the H.264/SVC Standard", IEEE Trans. on Circuits and Systems for Video Technology, Vol. 17, No. 9, September 2007.
[2] W. Gish, R. Webb, Z. Li, A. Tourapis, "Layered Compression Of High Dynamic Range, Visual Dynamic Range, and Wide Color Gamut Video", PCT Application PCT/US2010/026953, filed on Mar. 11, 2010.
[3] W. Gish, Z. Li, D. Pian, C. Vogt, H. Kim, and D. Ruhoff, "Extending Image Dynamic Range", PCT Application PCT/US2011/048861, filed on Aug. 23, 2011.
[4] Advanced video coding for generic audiovisual services, itu.int/rec/recommendation.asp?type=folders&lang=e&parent=T-REC-H.264, retrieved Dec. 21, 2011.
[5] Y. Gao, A. Segall, and T. Wiegand, "AHG Report: SVC bit depth and chroma format," Joint Video Team, Doc. JVT-W010, San Jose, Calif., April 2007.
[6] Y. Gao and Y. Wu, "CE4: SVC bit-depth scalability simulation results," Joint Video Team, Doc JVT-W102, San Jose, Calif., April 2007.
[7] A. Segall and Y. Su, "System for bit-depth scalable coding," Joint Video Team, Doc. JVT-W113, San Jose, Calif., April 2007.
[8] A. Segall, "CE4: Verif JVT-W102 (Thomson prop)," Joint Video Team, Doc. JVT-W116, San Jose, Calif., April 2007.
[9] Y. Gao and Y. Wu, "Simulation Results for CE2: SVC Bit-depth Scalability," Joint Video Team, JVT-X051, Geneva, Switzerland, June 2007.
[10] Y. Wu and Y. Gao, "Study on Inter-layer Prediction in Bit-Depth Scalability," Joint Video Team, JVT-X052, Geneva, Switzerland, June 2007.
[11] M. Winken, H. Schwarz, D. Marpe, and T. Wiegand, "CE2: SVC bit-depth scalability," Joint Video Team, JVT-X057, Geneva, Switzerland, June 2007.
[12] A. Segall and Y. Su, "CE2: Inter-layer Prediction for Bit-Depth Scalable Coding," Joint Video Team, JVT-X067, Geneva, Switzerland, June 2007.
[13] S. Liu, A. Vetro and W.-S. Kim, "Inter-layer Prediction for SVC Bit-Depth Scalable Coding," Joint Video Team, JVT-X075, Geneva, Switzerland, June 2007.
[14] Y. Ye, H. Chung, M. Karczewicz, and I. S. Chong, "Improvements to Bit Depth Scalability Coding," Joint Video Team, JVT-Y048, Shenzhen, China, October 2007.
[15] A. Segall, "CE1: Bit-Depth Scalability," Joint Video Team, JVT-X301r1, Geneva, Switzerland, June 2007
[16] JVT reference software, iphome.hhi.de/suehring/tml/downloadaM18.2.zip, retrieved Jan. 4, 2012.
[17] S. Qu, P. Yin, Y. Ye, Y. He, W. Gish, G.-M. Su, Y. Yuan, and S. Hulyalkar, "Specifying Visual Dynamic Range Coding Operations And Parameters", U.S. Provisional Application No. 61/582,614, filed on Jan. 3, 2012.

The invention claimed is:

1. A method of generating a picture region, the method comprising:
   providing a first layer comprising a plurality of first layer pictures having a first dynamic range associated with a first bit depth of the first layer pictures;
   providing a second layer comprising a plurality of second layer pictures having a second dynamic range associated with a second bit depth of the second layer pictures; wherein the second bit depth is higher than the first bit depth;
   performing a first mode of picture region generation comprising inverse mapping first bit depth data associated to the first dynamic range to second bit depth data associated to the second dynamic range of a region of a first layer picture from the plurality of first layer pictures to generate a first intermediate picture region;
   performing a second mode of picture region generation comprising utilizing a second layer temporal signal from one or more previously decoded pictures in the second layer to generate a second intermediate picture region, the second layer temporal signal comprising one or more pixels from the one or more previously decoded pictures in the second layer, wherein the first intermediate picture region and the second intermediate picture region correspond to the picture region to be generated;
   performing a third mode of picture region generation comprising, for each pixel location in the first intermediate picture region and the second intermediate picture region, computing an average of a pixel value corresponding to the pixel location in the first intermediate picture region and a pixel value corresponding to the same pixel location in the second intermediate picture region to generate a third intermediate picture region; and
   selecting as the picture region to be generated one picture region from among the first intermediate picture region, the second intermediate picture region, and the third intermediate picture region based on a metric;
   wherein selecting comprises:
      determining one or more ranges based on characteristics of the inverse mapping from the first dynamic range to the second dynamic range of prior first and second layer pictures, wherein each range is bounded by a pair of threshold pixel values at the first bit depth;
      determining whether or not a mean or other statistic of the region of the picture from the first layer is within one of the determined ranges;
      and if the mean or other statistic of the region of the picture from the first layer is within one of the determined ranges: selecting the first intermediate picture region as the picture region to be generated, otherwise selecting the second intermediate picture region as the picture region to be generated.

2. The method according to claim 1, wherein the performing of the first mode of picture region generation comprises:
utilizing a first layer temporal signal from one or more previously decoded pictures in the first layer; and
inverse mapping from the first dynamic range to the second dynamic range the first layer temporal signal to generate the first intermediate picture region,
wherein the first layer temporal signal comprises the region of the first layer picture.

3. The method according to claim 2, wherein the utilizing of the first layer temporal signal from the one or more previously decoded pictures in the first layer comprises:
providing a motion vector associated with the first layer temporal signal;
applying the motion vector to the first layer temporal signal to generate a motion compensated first layer temporal signal at a certain position; and
copying the motion compensated first layer temporal signal at the certain position to a collocated position in the picture region.

4. The method according to claim 1, wherein the utilizing of the second layer temporal signal from the one or more previously decoded pictures in the second layer comprises:
copying the second layer temporal signal from a collocated position in the one or more previously decoded pictures in the second layer to the collocated position in the picture region, wherein a motion vector associated with the second layer temporal signal comprises a zero vector.

5. The method according to claim 1, wherein the utilizing of the second layer temporal signal from the one or more previously decoded pictures in the second layer comprises:
providing a motion vector associated with the second layer temporal signal;
applying the motion vector to the second layer temporal signal to generate a motion compensated second layer temporal signal at a certain position; and
copying the motion compensated second layer temporal signal at the certain position to a collocated position in the picture region.

6. The method according to claim 5, further comprising explicitly signaling the motion vector at full precision to a decoding method.

7. The method according to claim 5, further comprising explicitly signaling the motion vector at reduced precision to a decoding method.

8. The method according to claim 5, wherein the motion vector associated with the second layer temporal signal is generated based on a collocated motion vector from the first layer.

9. The method according to claim 8, wherein the providing of the motion vector associated with the second layer temporal signal comprises:
scaling the collocated motion vector from the first layer based on a relative resolution ratio between the first layer and the second layer.

10. The method according to claim 1, wherein the selecting comprises selecting the third intermediate picture region as the picture region to be generated.

11. The method according to claim 1, wherein the determining of whether or not a mean or other statistic of the region of the picture from the first layer is within one of the determined ranges comprises:
computing a mean of the pixel values in the region of the picture from the first layer; and
if the computed mean is within one of the pairs of threshold pixel values: determining that the region of the picture from the first layer is within one of the determined ranges.

12. The method according to claim 11, wherein the pairs of threshold pixel values are determined prior to generating the region of the picture region.

13. The method according to claim 11, wherein the pairs of threshold pixel values are determined by analyzing data from a sequence of pictures, a scene, or a group of pictures.

14. The method according to claim 1, wherein the determining of whether or not a mean or other statistic of the region of the picture from the first layer is within one of the determined ranges comprises:
computing a mean of the pixel values in the region of the picture from the first layer; and
if the computed mean is within one of the pairs of threshold pixel values:
determining that the region of the picture from the first layer is within one of the determined ranges;
else:
determining that the region of the picture from the first layer is outside the determined ranges.

15. The method according to claim 14, wherein the pairs of threshold pixel values are determined prior to generating the region of the picture region.

16. The method according to claim 14, wherein the pairs of threshold pixel values are determined by analyzing data from a sequence of pictures, a scene, or a group of pictures.

17. A method of generating a picture region, the method comprising:
providing a first layer comprising a plurality of first layer pictures having a first dynamic range associated with a first bit depth of the first layer pictures;
providing a second layer comprising a plurality of second layer pictures having a second dynamic range associated with a second bit depth of the second layer pictures; wherein the second bit depth is higher than the first bit depth;
performing a first mode of picture region generation comprising inverse mapping first bit depth data associated to the first dynamic range to second bit depth data associated to the second dynamic range of a region of a picture from the first layer to generate a first intermediate picture region;
performing a second mode of picture region generation comprising utilizing a second layer temporal signal from one or more previously decoded pictures in the second layer to generate a second intermediate picture region, wherein the second layer temporal signal comprises one or more pixels from the one or more previously decoded pictures in the second layer, wherein the first intermediate picture region and the second intermediate picture region correspond to the picture region to be generated; and
selecting, as the picture region to be generated, one picture region from among the first intermediate picture region and the second intermediate picture region based on a metric;
wherein selecting comprises:
determining one or more ranges based on characteristics of the inverse mapping from the first dynamic range to the second dynamic range of prior first and second layer pictures, wherein each range is bounded by a pair of threshold pixel values at the first bit depth;

determining whether or not a mean or other statistic of the region of the picture from the first layer is within one of the determined ranges; and if the mean or other statistic of the region of the picture from the first layer is within one of the determined ranges: selecting the first intermediate picture region as the picture region to be generated, otherwise selecting the second intermediate picture region as the picture region to be generated.

18. The method according to claim 17, wherein the performing of the first mode of picture region generation comprises:

utilizing a first layer temporal signal from one or more previously decoded pictures in the first layer; and inverse mapping from the first dynamic range to the second dynamic range the first layer temporal signal to generate the first intermediate picture region, wherein the first layer temporal signal comprises the region of the first layer picture.

19. The method according to claim 18, wherein the utilizing of the first layer temporal signal from the one or more previously decoded pictures in the first layer comprises:

providing a motion vector associated with the first layer temporal signal;

applying the motion vector to the first layer temporal signal to generate a motion compensated first layer temporal signal at a certain position; and copying the motion compensated first layer temporal signal at the certain position to a collocated position in the picture region.

20. The method according to claim 17, wherein the utilizing of the second layer temporal signal from the one or more previously decoded pictures in the second layer comprises:

copying the second layer temporal signal from a collocated position in the one or more previously decoded pictures in the second layer to the collocated position in the picture region, wherein a motion vector associated with the second layer temporal signal comprises a zero vector.

21. The method according to claim 17, wherein the utilizing of the second layer temporal signal from one or more previously decoded pictures in the second layer comprises:

providing a motion vector associated with the second layer temporal signal;

applying the motion vector to the second layer temporal signal to generate a motion compensated second layer temporal signal at a certain position; and copying the motion compensated second layer temporal signal at the certain position to a collocated position in the picture region.

22. The method according to claim 21, further comprising explicitly signaling the motion vector at full precision to a decoding method.

23. The method according to claim 21, further comprising explicitly signaling the motion vector at reduced precision to a decoding method.

24. The method according to claim 21, wherein the motion vector associated with the second layer temporal signal is generated based on a collocated motion vector from the first layer.

25. The method according to claim 24, wherein the providing of the motion vector associated with the second layer temporal signal comprises:

scaling the collocated motion vector from the first layer based on a relative resolution ratio between the first layer and the second layer.

* * * * *